United States Patent
Ahne et al.

(10) Patent No.: US 10,877,398 B2
(45) Date of Patent: *Dec. 29, 2020

(54) TONER CARTRIDGE FOR IMAGE FORMING DEVICE INCLUDING FLIGHT WITH MAGNETIC PARTICLES TO GENERATE A MAGNETIC FIELD

(71) Applicant: Lexmark International, Inc., Lexington, KY (US)

(72) Inventors: Adam Jude Ahne, Lexington, KY (US); Graydon Randall Dodson, Lexington, KY (US); Roger Steven Cannon, Nicholasville, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/440,590

(22) Filed: Feb. 23, 2017

(65) Prior Publication Data

US 2018/0039203 A1 Feb. 8, 2018

Related U.S. Application Data

(63) Continuation of application No. 15/227,637, filed on Aug. 3, 2016.

(51) Int. Cl.
| | |
|---|---|
| *G06K 7/08* | (2006.01) |
| *G06K 19/06* | (2006.01) |
| *G03G 15/08* | (2006.01) |
| *G09C 1/00* | (2006.01) |
| *H04L 9/08* | (2006.01) |
| *G06Q 10/00* | (2012.01) |
| *H04L 9/32* | (2006.01) |
| *G06Q 30/00* | (2012.01) |

(52) U.S. Cl.
CPC .......... *G03G 15/0865* (2013.01); *G06Q 10/00* (2013.01); *G06Q 30/018* (2013.01); *G09C 1/00* (2013.01); *H04L 9/0866* (2013.01); *H04L 9/3247* (2013.01)

(58) Field of Classification Search
CPC .......................... G06K 7/087; G06K 19/06187
USPC ................................ 235/449, 393, 420, 493
See application file for complete search history.

(56) References Cited

U.S. PATENT DOCUMENTS

| | | |
|---|---|---|
| 3,675,367 A | 7/1972 | Amburn |
| 4,218,674 A | 8/1980 | Brosow |

(Continued)

FOREIGN PATENT DOCUMENTS

| | | |
|---|---|---|
| EP | 1054343 A1 | 11/2000 |
| EP | 1 475 242 A1 | 11/2004 |

(Continued)

OTHER PUBLICATIONS

Non-final Office Action dated Apr. 21, 2017; U.S. Appl. No. 15/440,590.

(Continued)

*Primary Examiner* — Daniel St. Cyr

(57) ABSTRACT

A toner cartridge for an image forming device includes a body for holding toner and a flight. The flight contains magnetic particles and is configured to guide movement of a magnetic field sensor. The magnetic particles generate a magnetic field that the sensor reads. Other systems and methods are disclosed.

20 Claims, 8 Drawing Sheets

(56) References Cited

U.S. PATENT DOCUMENTS

| | | |
|---|---|---|
| 4,734,695 A | 5/1988 | Goldman |
| 5,451,759 A | 9/1995 | Hoshino |
| 5,792,380 A * | 8/1998 | Wen .................... B41J 2/17509 |
| | | 106/31.32 |
| 5,857,129 A * | 1/1999 | Harris ................ G03G 15/0872 |
| | | 399/12 |
| 5,981,053 A | 11/1999 | Naylor |
| 7,005,733 B2 | 2/2006 | Kommerling |
| 7,218,589 B2 | 5/2007 | Nisnudel |
| 7,353,994 B2 | 4/2008 | Farrall |
| 7,427,020 B2 | 9/2008 | Haraszti |
| 7,865,722 B2 | 1/2011 | Moran |
| 8,421,625 B2 | 4/2013 | Cowburn |
| 8,497,983 B2 | 7/2013 | Cowburn |
| 8,502,668 B2 | 8/2013 | Cowburn |
| 8,742,891 B2 | 6/2014 | Greene |
| 9,454,125 B1 | 9/2016 | Bejat et al. |
| 9,524,456 B1 | 12/2016 | Ahne |
| 9,542,576 B1 * | 1/2017 | Ahne .................... G06K 7/087 |
| 2002/0021909 A1 | 2/2002 | Harumoto |
| 2003/0059050 A1 * | 3/2003 | Hohberger ............. B41J 17/36 |
| | | 380/270 |
| 2004/0114944 A1 * | 6/2004 | Urabe ................ G03G 15/0863 |
| | | 399/12 |
| 2005/0017082 A1 | 1/2005 | Moran |
| 2005/0111342 A1 | 5/2005 | Wisnudel |
| 2005/0219600 A1 | 10/2005 | Lapstun |
| 2005/0258962 A1 * | 11/2005 | Phipps ............... G06K 7/10386 |
| | | 340/572.1 |
| 2006/0056021 A1 | 3/2006 | Yeo |
| 2007/0199991 A1 | 8/2007 | Haraszti |
| 2007/0222604 A1 * | 9/2007 | Phipps ................ G06K 7/0008 |
| | | 340/572.7 |
| 2008/0052518 A1 * | 2/2008 | Newton ............. G03G 21/1878 |
| | | 713/176 |
| 2009/0061226 A1 | 3/2009 | Banin |
| 2010/0038598 A1 | 2/2010 | Bastiaansen |
| 2010/0061772 A1 * | 3/2010 | Hayashi ................ G03G 15/09 |
| | | 399/263 |
| 2010/0196056 A1 | 8/2010 | Ohkawa et al. |
| 2010/0215406 A1 * | 8/2010 | Ozawa ............... G03G 15/0808 |
| | | 399/257 |
| 2010/0219251 A1 | 9/2010 | Decoux |
| 2011/0038649 A1 * | 2/2011 | Miyabe .............. G03G 15/0896 |
| | | 399/119 |
| 2011/0099117 A1 | 4/2011 | Schepers |
| 2011/0229211 A1 * | 9/2011 | Ohashi ............... G03G 15/0853 |
| | | 399/258 |
| 2012/0020678 A1 * | 1/2012 | Wilsher ............... G03G 15/553 |
| | | 399/12 |
| 2012/0076543 A1 * | 3/2012 | Rapkin ............. G03G 15/0891 |
| | | 399/256 |
| 2012/0163872 A1 | 6/2012 | Hayashi et al. |
| 2013/0029112 A1 * | 1/2013 | Bargir .................... B41F 11/02 |
| | | 428/195.1 |
| 2014/0270857 A1 * | 9/2014 | Harpur ............... G03G 15/0836 |
| | | 399/262 |
| 2016/0105220 A1 | 4/2016 | Kim et al. |
| 2016/0245878 A1 | 8/2016 | Hwayn |
| 2017/0103791 A1 * | 4/2017 | Booth ................... H04L 9/3278 |

FOREIGN PATENT DOCUMENTS

| | | |
|---|---|---|
| WO | 2005/112009 A2 | 11/2005 |
| WO | 2012/020263 A1 | 2/2012 |

OTHER PUBLICATIONS

Amendment entered Jul. 19, 2017; U.S. Appl. No. 15/440,590.
Final Office Action dated Sep. 11, 2017; U.S. Appl. No. 15/440,590.
International Search Report dated Jan. 6, 2017 PCT/US16/63832.
International Written Opinion dated Jan. 6, 2017 PCT/US16/63832.
International Search Report dated Jan. 23, 2017; PCT/US16/61063.
International Written Report dated Jan. 23, 2017; PCT/US16/61063.
Non-final office action dated Jun. 22 2016; U.S. Appl. No. 14/879,335.
Non-final office action dated Jun. 17, 2016; U.S. Appl. No. 14/879,344.
International Search Report; dated Feb. 21, 2018; PCT/US2017/064427.
Written Opinion of the International Searching Authority; dated Feb. 21, 2018; PCT/US2017/0664427.
Roel Maes, Ingrid Verbauwhede, "Physically unclonable functions: A study on the state of the art and future research directions", article, 2010.
Pappu Srinivasa Ravikanth, "Physical One-Way Functions", thesis, Mar. 2001, MIT.
Extended European Search Report; dated Feb. 21, 2020; EP16911783.
Extended European Search Report; dated Apr. 17, 2020; EP 16920996.

* cited by examiner

TONER CARTRIDGE FOR IMAGE FORMING DEVICE INCLUDING FLIGHT WITH MAGNETIC PARTICLES TO GENERATE A MAGNETIC FIELD

CROSS REFERENCES TO RELATED APPLICATIONS

This application claims priority as a continuation of U.S. patent application Ser. No. 15/227,637, filed Aug. 3, 2016.

BACKGROUND

1. Field of the Disclosure

The present disclosure relates generally to anti-counterfeit systems and more particularly to physical unclonable functions.

2. Description of the Related Art

Counterfeit printer supplies, such as toner bottles, are a problem for consumers. Counterfeit supplies may perform poorly and may damage printers. Printer manufacturers use authentication systems to deter counterfeiters. Physical unclonable functions (PUF) are a type of authentication system that implements a physical one-way function. Ideally, a PUF cannot be identically replicated and thus is difficult to counterfeit. Thus, it is advantageous to maximize the difficulty of replicating a PUF to deter counterfeiters. It is also advantageous for the PUF and PUF reader to be low cost.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
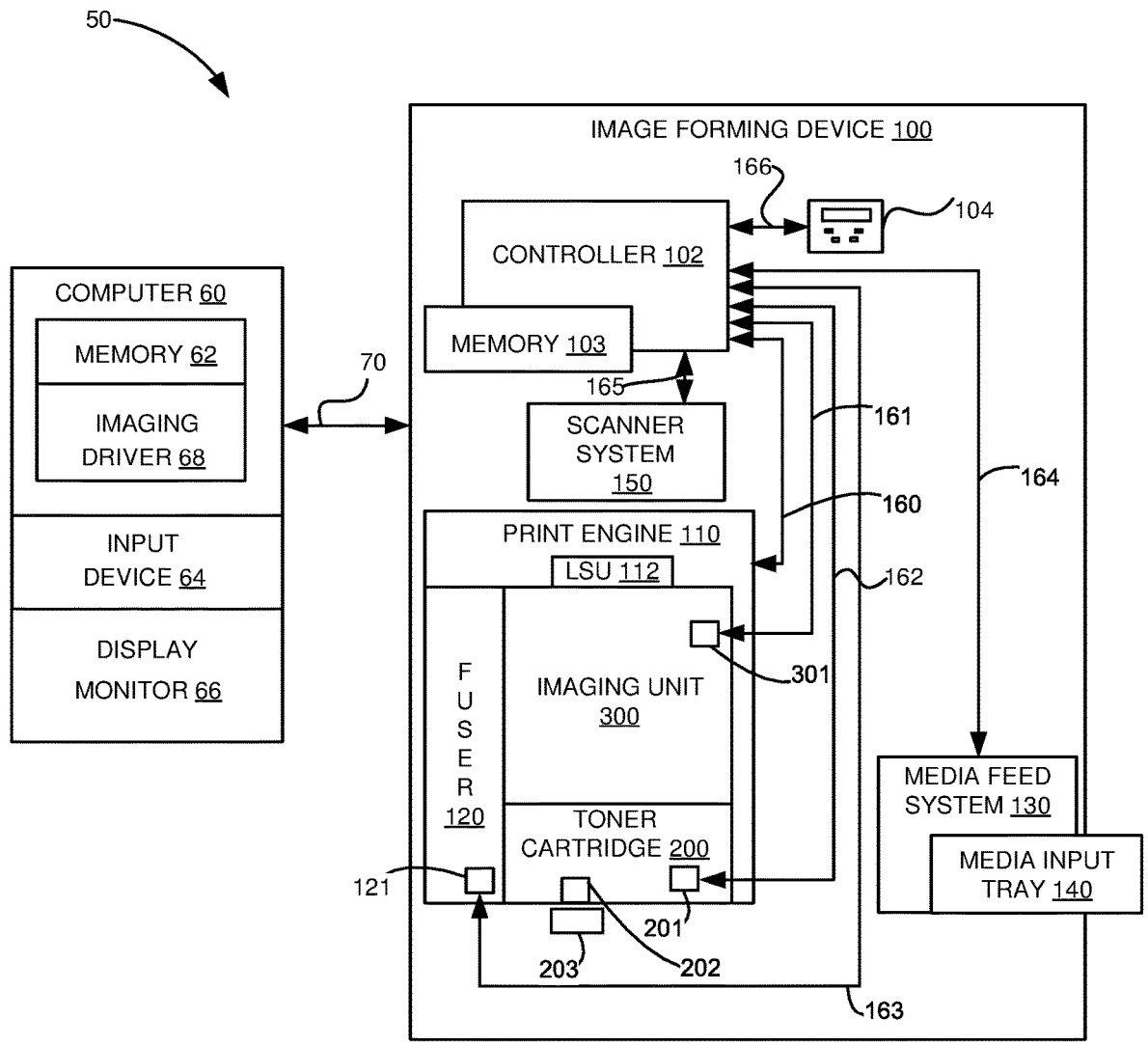
FIG. 1 is a block diagram of an imaging system including an image forming device according to one example embodiment.

Referring to the drawings and particularly to FIG. 1, there is shown a block diagram depiction of an imaging system 50 according to one example embodiment. Imaging system 50 includes an image forming device 100 and a computer 60. Image forming device 100 communicates with computer 60 via a communications link 70. As used herein, the term "communications link" generally refers to any structure that facilitates electronic communication between multiple components and may operate using wired or wireless technology and may include communications over the Internet.

In the example embodiment shown in FIG. 1, image forming device 100 is a multifunction device (sometimes referred to as an all-in-one (AIO) device) that includes a controller 102, a user interface 104, a print engine 110, a laser scan unit (LSU) 112, one or more toner bottles or cartridges 200, one or more imaging units 300, a fuser 120, a media feed system 130 and media input tray 140, and a scanner system 150. Image forming device 100 may communicate with computer 60 via a standard communication protocol, such as, for example, universal serial bus (USB), Ethernet or IEEE 802.xx. Image forming device 100 may be, for example, an electrophotographic printer/copier including an integrated scanner system 150 or a standalone electrophotographic printer.

Controller 102 includes a processor unit and associated memory 103 and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and non-volatile memory 201 on each toner cartridge 200 via communications link(s) 162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121 and 301 may include a processor and associated memory such as RAM. ROM, and/or non-volatile memory and may provide authentication functions, safety and operational interlocks, operating parameters and usage information related to fuser 120, toner cartridge(s) 200) and imaging unit(s) 300, respectively. Controller 102 processes print and scan data and operates print engine 110 during printing and scanner system 150 during scanning.

Computer 60, which is optional, may be, for example, a personal computer, including memory 62, such as RAM, ROM, and/or NVRAM, an input device 64, such as a keyboard and/or a mouse, and a display monitor 66. Computer 60 also includes a processor, input/output (I/O) interfaces, and may include at least one mass data storage device, such as a hard drive, a CD-ROM and/or a DVD unit (not shown). Computer 60 may also be a device capable of communicating with image forming device 100 other than a personal computer such as, for example, a tablet computer, a smartphone, or other electronic device.

In the example embodiment illustrated, computer 60 includes in its memory a software program including program instructions that function as an imaging driver 68, e.g., printer/scanner driver software, for image forming device 100. Imaging driver 68 is in communication with controller 102 of image forming device 100 via communications link 70. Imaging driver 68 facilitates communication between image forming device 100 and computer 60. One aspect of imaging driver 68 may be, for example, to provide formatted print data to image forming device 100, and more particularly to print engine 110, to print an image. Another aspect of imaging driver 68 may be, for example, to facilitate the collection of scanned data from scanner system 150.

In some circumstances, it may be desirable to operate image forming device 100 in a standalone mode. In the standalone mode, image forming device 100 is capable of functioning without computer 60. Accordingly, all or a portion of imaging driver 68, or a similar driver, may be located in controller 102 of image forming device 100 so as to accommodate printing and/or scanning functionality when operating in the standalone mode.

Several components of the image forming device 100 are user replaceable e.g. toner cartridge 200, fuser 120, and imaging unit 300. It is advantageous to prevent counterfeiting these user replaceable components. A PUF 202 may be attached to the toner cartridge 200 to prevent counterfeiting as described below. A PUF reader 203 may be integrated into the image forming device 100 to verify the authenticity of the PUF 202. Data related to the PUF 202 may reside in non-volatile memory 201.

Figure 2:
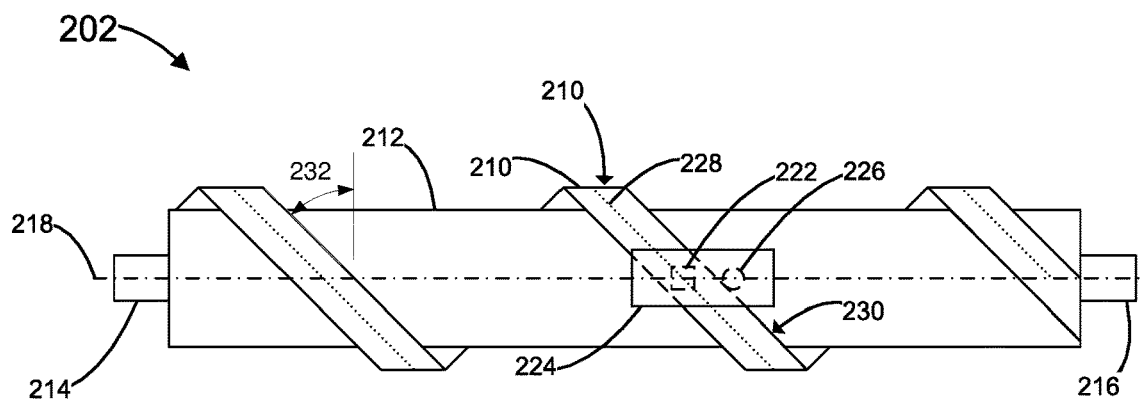
FIG. 2 is a top view of a helical PUF.

FIG. 2 shows PUF 202 with a flight 210 formed as a helical flight extending around a shaft 212. The helical flight 210 and the shaft 212 may be coextensive and formed together as one integrated part. Alternatively, they may be two separate parts attached together. The PUF 202 has a pair of cylindrical supports 214, 216 that extend laterally from each end of the PUF 202. In operation, the PUF 202 rotates about an axis of rotation 218. The cylindrical supports 214, 216, the shaft 212, and the helical flight 210 are centered on the axis of rotation. The flight 210 may be referred to as an auger, a spiral flight or other.

The helical flight 210 contains magnetized particles that generate a magnetic field, including a magnetic field above the top surface 220 of the helical flight 210. The magnetized particles are, for example, flakes of an alloy of neodymium, iron and boron (NdFeB). The shaft 212 may contain magnetized particles to add complexity to the magnetic field. The PUF 202 may be located on a body of a supply item for an image forming device such as, for example, toner cartridge 200. When the toner cartridge 200 is located in the image forming device 100, the PUF 202 interfaces with the PUF reader 203, which contains a magnetic field sensor 222 mounted to a printed circuit board (PCB) 224. The PCB 224 also has a locating pin 226.

Figure 3:
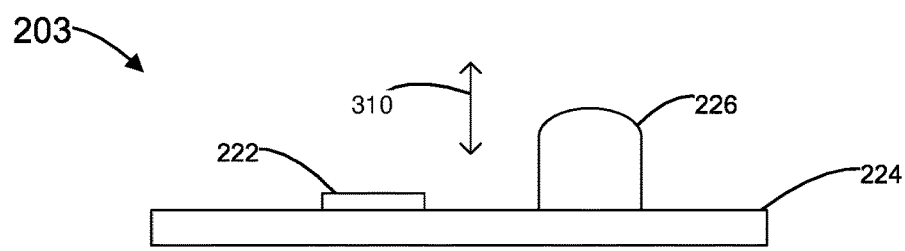
FIG. 3 is a side view of a PUF reader.

FIG. 3 shows a side view of the PUF reader 203, including the magnetic field sensor 222, the PCB 224, and the locating pin 226. The locating pin 226 is taller than the magnetic field sensor 222. When the PUF reader 203 is engaged with the PUF 202, the flight guides movement of the reader. Preferably, the locating pin 226 rides on the shaft 212 and the magnetic field sensor 222 is located above the helical flight 210 without contacting the helical flight 210. The locating pin material and shape may be selected to minimize the drag against the PUF 202. Alternatively, the magnetic field sensor 222 may ride on the helical flight 210. The PUF reader 203 is mounted such that it is free to move in a compliance direction 310 that is preferably radial to the axis of rotation 218. Preferably, the PUF reader 203 is biased by a spring against the shaft 212. This mounting compliance helps accommodate mechanical and positional tolerances between the PUF 202 and the PUF reader 203, which improves reliability and reduces manufacturing costs. The magnetic field sensor 222 may make measurements radial to the axis of rotation 218 i.e. parallel to the compliance direction 310. The magnetic field sensor 222 may make measurements parallel to the axis of rotation 218 i.e. perpendicular to the compliance direction 310. The magnetic field sensor 222 may make measurements in three orthogonal directions.

The locating pin 226 is biased against a side surface 230 of the helical flight 210. The magnetic field sensor 222 follows a measurement path 228 along a section of the helical flight 210. The measurement path 228 is at a fixed distance from the side surface 230. The distance between the magnetic field sensor 222 and the locating pin 226 as well as the angle between the PUF reader 203 and the helical flight 210 determines the fixed distance.

In operating, the PUF reader 203 is moved parallel to the axis of rotation 218. The locating pin 226 pushes against the side surface 230, causing the PUF 202 to rotate about the axis of rotation 218. Since the locating pin 226 remains in contact with the side surface 230, the positional accuracy of the measurement path 228 remains steadfast along an extent of the flight. This is important, since shifting the measurement path 228 laterally by a small amount may radically change the magnetic field seen by the magnetic field sensor 222. The helical PUF 202 is superior to a linear PUF since translation of the PUF reader to read the PUF also maintains the position of the PUF reader relative to the PUF. Preferably, the magnetic field sensor 222 and locating pin 226 are aligned parallel to the axis of rotation 218 to prevent a counterfeiter from replacing the helical PUF 202 with a linear PUF since the locating pin 226 would raise the magnetic field sensor 222 too far above the linear PUF.

The helical flight 210 has a helix angle 232. Preferably, the helix angle 232 is between thirty degrees and sixty degrees inclusive. If the helix angle 232 is less than thirty degrees the PUF 202 may bind and fail to rotate. If the helix angle 232 is more than sixty degrees the PUF 202 may fail to maintain contact between the locating pin 226 and the side surface 230. Preferably, the helix angle 232 is less than sixty degrees so the maximum helical flight length may be provided for a given PUF length, since a longer PUF is harder to duplicate than is a shorter PUF.

Figure 4:
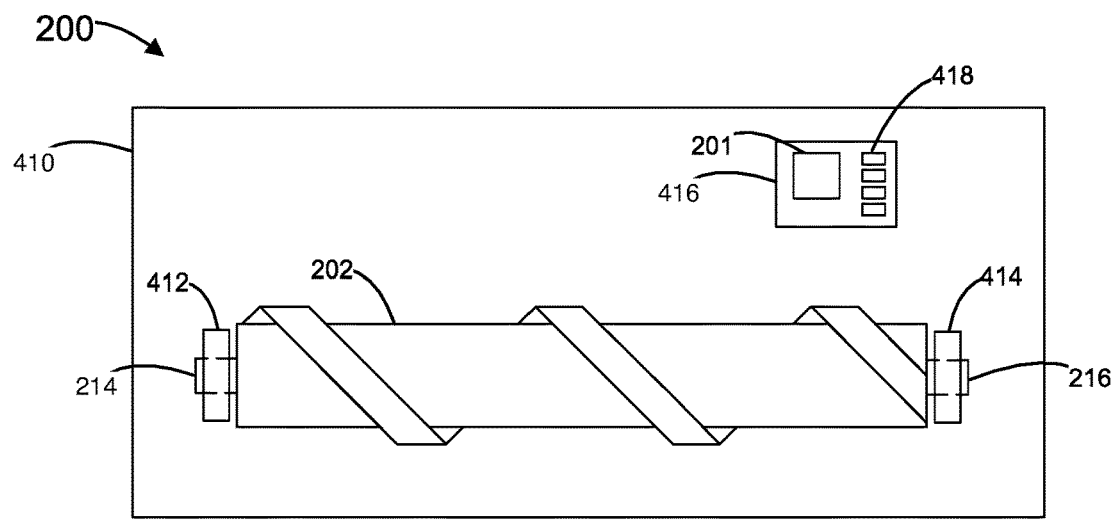
FIG. 4 is a top view of a supply item for an imaging device having a helical PUF.

FIG. 4 shows the helical PUF 202 located on a supply item for an imaging device e.g. toner cartridge 200. The toner cartridge 200 has a body 410 for holding toner. The helical PUF 202 is rotatably mounted to the body by bearings 412, 414 that encircle the cylindrical supports 214, 216. Non-volatile memory 201 is also located on the body 410 and is mounted to a PCB 416 having a column of electrical contact pads 418. The non-volatile memory 201 may contain an array of numbers corresponding to the intensity of the magnetic field along a section of the measurement path 228. The non-volatile memory 201 may also contain a digital signature generated from the array of numbers. To clone the toner cartridge, a counterfeiter must either duplicate a genuine helical PUF and also duplicate the accompanying non-volatile memory, which is difficult, or the counterfeiter must create a counterfeit helical PUF and also create a properly signed array of measurements corresponding to the counterfeit PUF, which is also difficult. Thus, the toner cartridge 200 is protected from counterfeiting.

Figure 5:
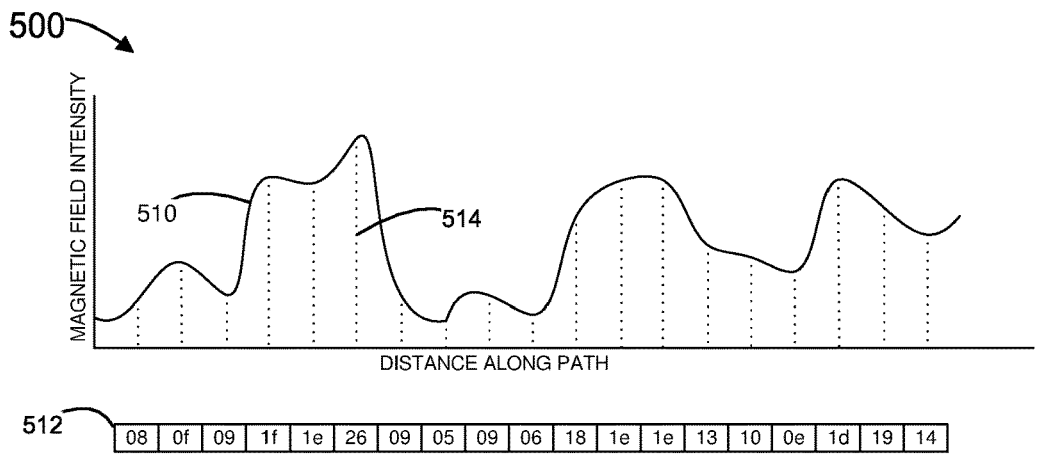
FIG. 5 is a graph of magnetic field intensity above a helical flight.

FIG. 5 shows a graph 500) of the intensity 510 of an example magnetic field along a section of the measurement path 228. An array of numbers 512 corresponds to the magnetic field intensity measured at regular intervals along the path, as shown by dotted lines 514 on the graph. Preferably, the array of numbers 512 are integers to simplify processing. Alternatively, the array of numbers may be, for example, floating point. The numbers in FIG. 5 and FIG. 6 are in hexadecimal format.

Figure 6:
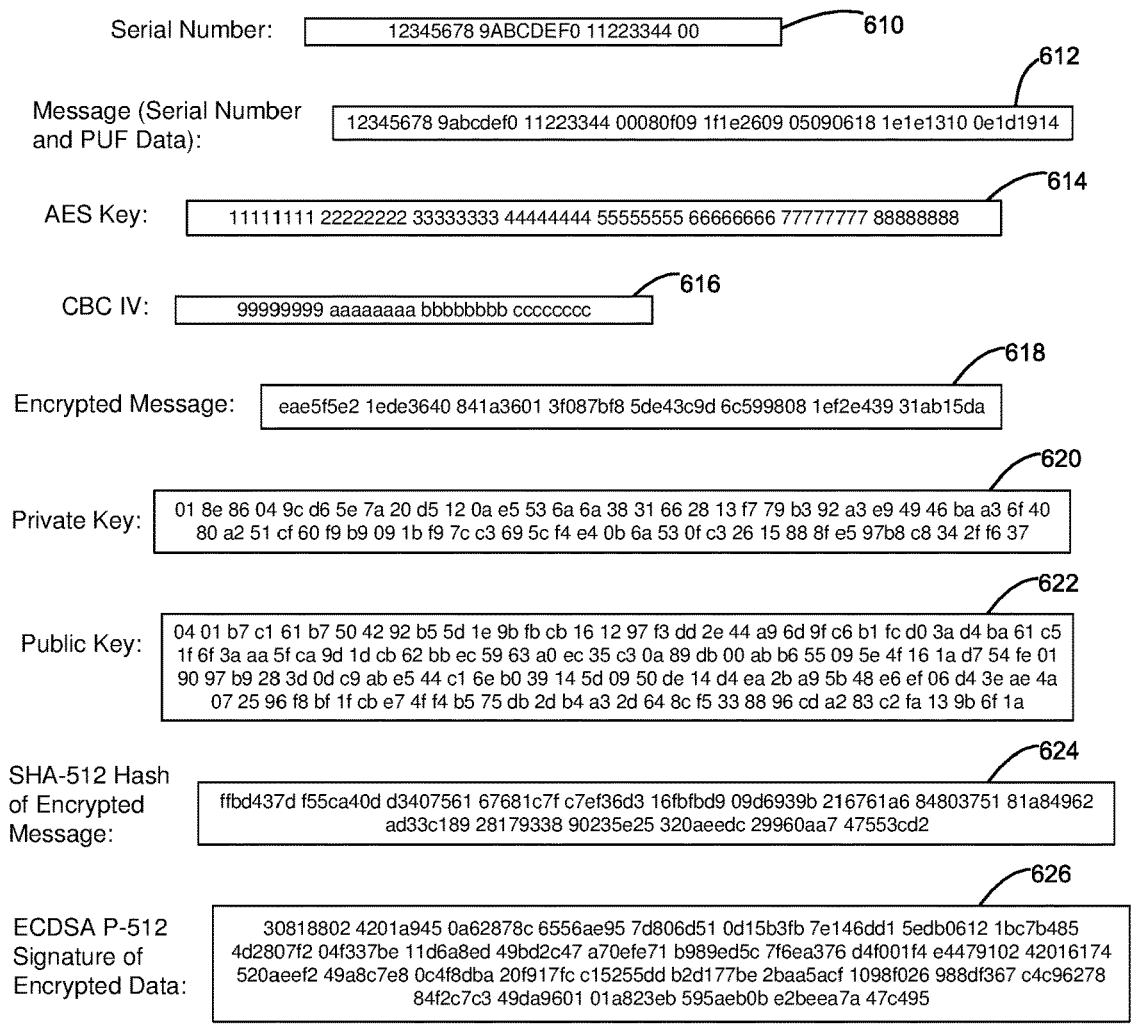
FIG. 6 is example values for generating a digital signature.

FIG. 6 shows an example of generating a digital signature from the array of numbers 512. Other algorithms for generating a digital signature are known in the art. The digital signature is used by the controller 102 to verify that the PUF data in the non-volatile memory is authentic. The toner cartridge's serial number 610 and the array of numbers 512 are combined to form a message 612. Preferably, the message is encrypted. Alternatively, the message may be unencrypted. For this example, AES-CBC is used (see, for example, RFC3602 "The AES-CBC Cipher Algorithm and Its Use with IPsec" published by The Internet Society (2003), and NIST (National Institute of Standards) documents FIPS-197 (for AES) and to SP800-38A (for CBC)). The AES key 614 and CBC Initialization Vector (IV) 616 are used as is known in the art to generate the encrypted message 618. In this example, to sign the encrypted message 618 first the message is hashed then the hash is encrypted with the private key 620 of an asymmetric key pair that includes a public key 622. This example uses the SHA-512 hashing algorithm and Elliptic Curve Digital Signature Algorithm (ECDSA) utilizing a P-512 curve key, as is known in the art. Other algorithms are known in the art. The SHA-512 hash 624 of the encrypted message 618 is used to generate an ECDSA P-512 digital signature 626. The signature 626 and encrypted message 618 are stored in the non-volatile memory 201. The image forming device 100 may use the array of numbers 512 in the encrypted message 618 to verify the authenticity of the helical PUF 202, and the image forming device 100 may use the digital signature 626 to verify the authenticity of the array of numbers 512. In this way, the image forming device 100 may verify the authenticity of the toner cartridge 200.

Figure 7:
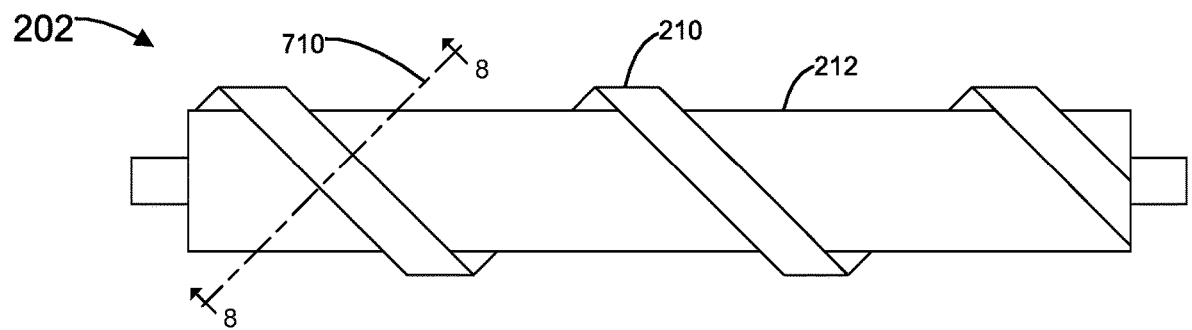
FIG. 7 is a top view of a helical PUF.
Figure 8:
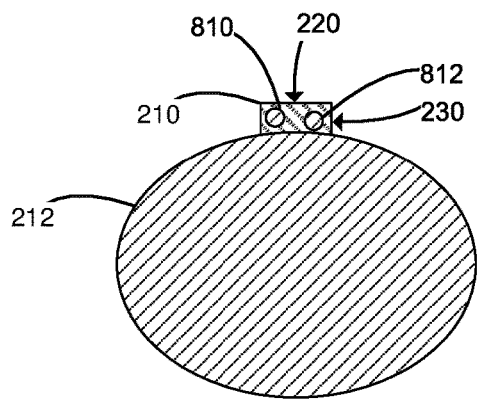
FIG. 8 is a section view of a helical PUF.
Figure 9:
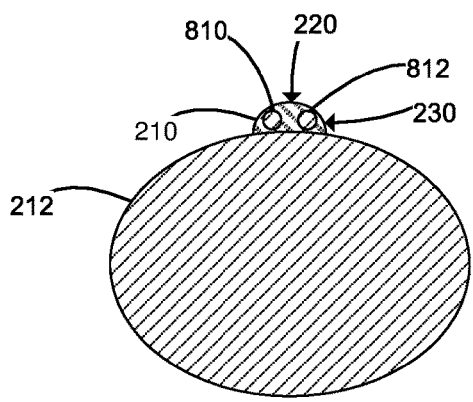
FIG. 9 is a section view of a helical PUF.

FIG. 7 shows the helical PUF 202. FIG. 8 shows a section view of the helical PUF 202 cut along cross-section line 710. In this example, the shaft 212 and the helical flight 210 are two separate parts attached together. The helical flight 210 contains magnetized particles 810, 812 that generate a magnetic field above the top surface 220 and adjacent to the side surface 230. The helical flight 210 has a rectangular cross section. The side surface 230 is planar which improves the locating tolerance of the locating pin 226. FIG. 9 shows an alternate embodiment with the helical flight 210 having a semi-circular cross section. The side surface 230 is curved which reduces the friction between the locating pin 226 and the helical flight 210. Other helical flight cross sections may be used e.g. triangular, etc.

Figure 10:
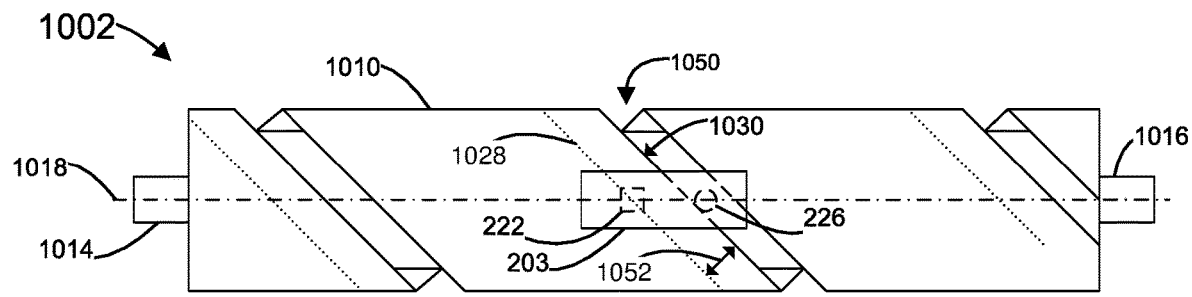
FIG. 10, FIG. 11, and FIG. 12 are top views of a helical PUF.

FIG. 10 shows an alternate embodiment of a helical PUF 1002. The helical flight is a shaft 1010 that has a helical channel 1050 wrapped around the shaft 1010. The shaft 1010 contains magnetized particles that generate a magnetic field above the shaft 1010 having varying intensity. The helical channel 1050 has a first side surface 1030. The helical PUF 1002 is configured to rotate about an axis of rotation 1018. A pair of cylindrical supports 1014, 1016, the shaft 1010, and the helical channel 1015 are centered on the axis of rotation.

Figure 11:
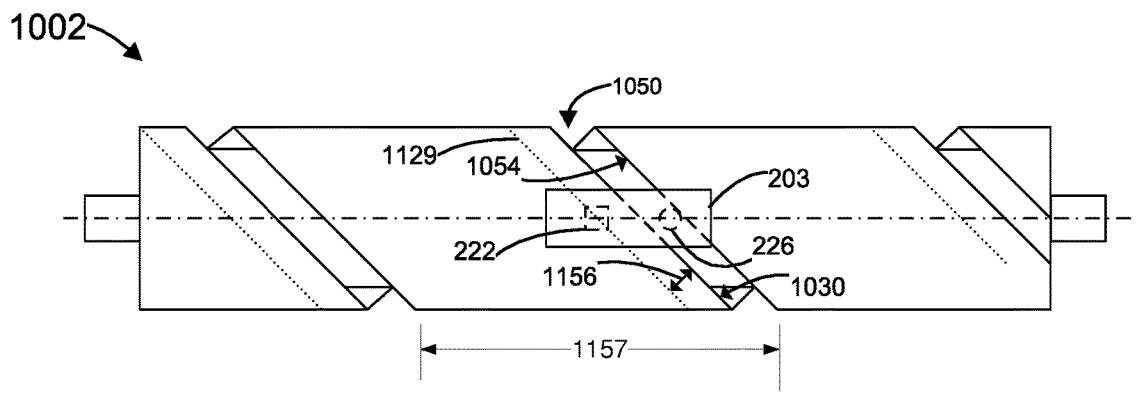

In operation, the locating pin 226 of the PUF reader 203 pushes against the first side surface 1030, causing the magnetic field sensor 222 to follow a first measurement path 1028 along a section of the length of the helical channel 1050. The first measurement path 1028 is at a first fixed distance 1052 from the side surface 1030. In this example, the PUF reader 203 is moving from right to left. FIG. 11 shows the helical PUF 1002 while the PUF reader 203 is moving from left to right. The locating pin 226 pushes against a second side surface 1054 of the helical channel 1050, causing the magnetic field sensor 222 to follow a second measurement path 1129 located a second fixed distance 1156 from the first side surface 1030. The second fixed distance 1156 is shorter than the first fixed distance 1052. Thus, a single helical PUF 1002 with a single PUF reader 203 may measure two different measurement paths by alternating the direction of travel of the PUF reader 203. This makes it more difficult to counterfeit the helical PUF 1002, since two measurement paths must be duplicated. In operation, preferably the PUF reader 203 initially moves by at least the helical channel pitch 1157 to be sure the locating pin 226 falls into the helical channel. Then, the PUF reader 203 moves in the opposite direction at least a distance equal to the helical channel pitch since the actuator moving the PUF reader 203 will be designed to travel at least that distance.

Figure 12:
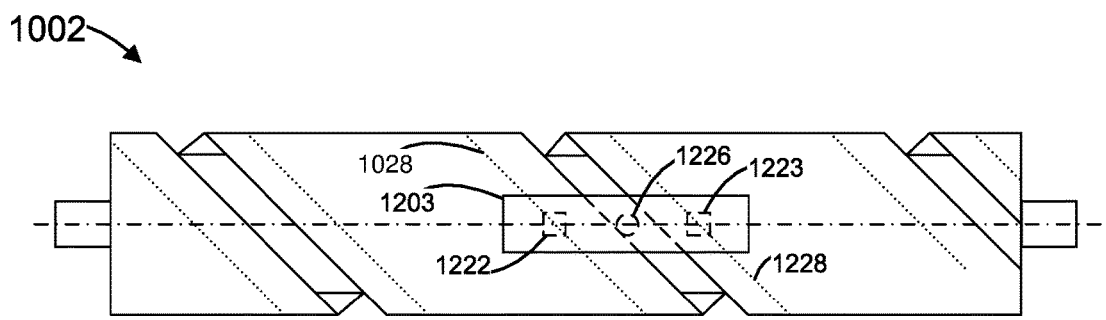

FIG. 12 shows an alternate PUF reader 1203 that may measure along two measurement paths 1028, 1228 simultaneously. The PUF reader 1203 has two magnetic field sensors 1222, 1223 located on opposite sides of a locating pin 1226.

Figure 13:
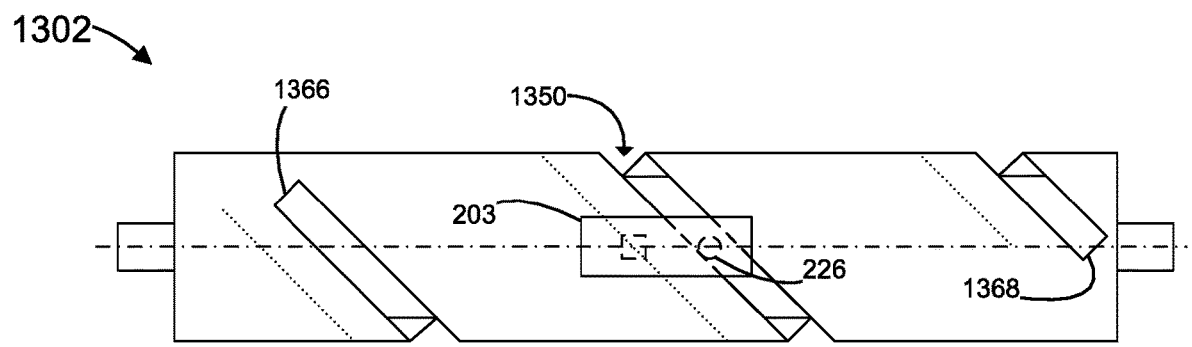
FIG. 13 is a top view of a helical PUF.

FIG. 13 shows an alternate embodiment of a helical PUF 1302. A helical channel 1350 wraps around a shaft having magnetized particles. The helical channel 1350 terminates in a stop 1366 at the left end and a second stop 1368 at the right end 1368. In operation, the PUF reader 203 may be moved laterally along the helical PUF 1302 from left to right until the locating pin 226 hits stop 1368. The controller 102 may detect this event by monitoring drive current to a motor that moves the PUF reader 203. When this event is detected, the controller 102 knows the PUF reader 203 is at a home position relative to the PUF 1302. Knowing this helps the controller 102 to align data measured along a measurement path with data stored in the toner cartridge non-volatile memory. A second home position may be at stop 1366.

Figure 14:
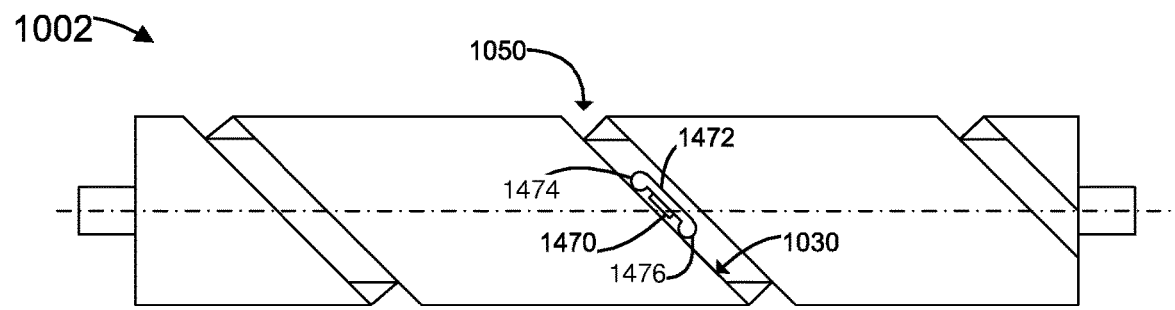
FIG. 14 is a top view of a helical PUF.

FIG. 14 shows an alternate PUF reader 1472 that measures a magnetic field adjacent to the side surface 1030. The PUF reader 1472 has a magnetic field sensor 1470 that measures the intensity of the magnetic field normal to the side surface 1030 and parallel to the side surface. The PUF reader 1472 touches the side surface 1030 with a pair of spacers 1474, 1476. In operation, the PUF reader 1472 is moved parallel to the axis of rotation to measure a section of the length of the helical channel 1050.

Figure 15:
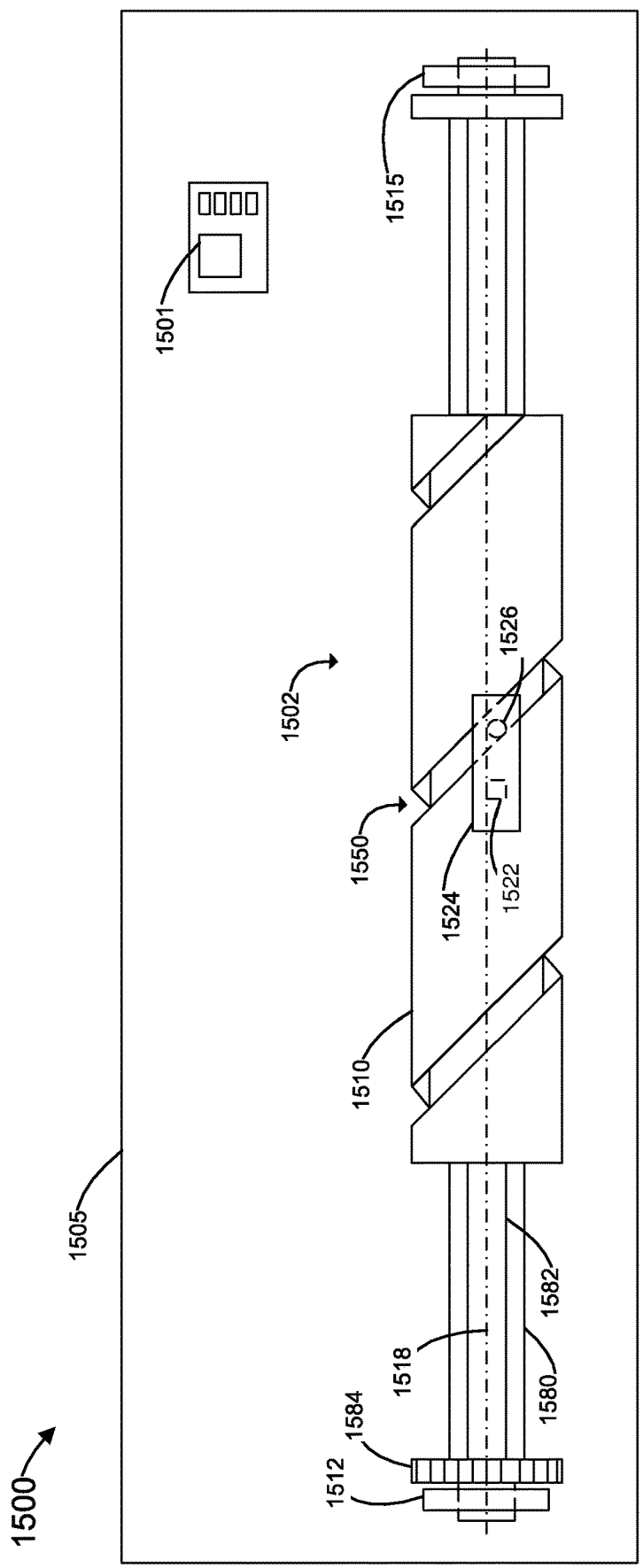
FIG. 15 is a top view of a supply item for an imaging device having a helical PUF.

FIG. 15 shows an alternate embodiment of a supply item for an imaging device e.g. toner cartridge 1500. The toner cartridge 1500 has a body 1505 for holding toner. A helical PUF 1502 is configured to slide laterally along a drive shaft 1580 located on an axis of rotation 1518 of the helical PUF 1502. The drive shaft 1580 may be turned by a drive gear 1584 that is coupled to a motor located in the imaging device 100. The helical PUF 1502 is rotatably mounted to the body 1505 by bearings 1512, 1515. The drive shaft 1580 has a flat area 1582 which gives the drive shaft 1580 a "D" shaped cross section i.e. the drive shaft 1580 is a D-shaft. The helical PUF 1502 has a "D" shaped hole around the axis of rotation 1518 that is larger than the cross section of the drive shaft 1580. Thus, the helical PUF 1502 will rotate when the drive shaft 1580 is rotated and the helical PUF 1502 is free to slide laterally along the drive shaft 1580 parallel to the axis of rotation.

The helical PUF 1502 has a helical flight 1510 and a helical channel 1550. The helical flight 1510 contains magnetized particles that generate a magnetic field adjacent to the helical flight 1510. A PUF reader 1503, located in the imaging device 100, has a locating pin 1526 and a magnetic field sensor 1522. The PUF reader 1503 is fixedly mounted to the imaging device 100. In operation, rotation of the drive shaft 1580 causes a side surface of the helical flight 1510 to contact the locating pin 1526, which causes the helical PUF 1502 to slide laterally along the drive shaft 1580. The magnetic field sensor 1522 reads the intensity of the magnetic field along a section of the length of the helical flight, and the controller 102 compares the measured field to an array of numbers stored in a non-volatile memory 1501 mounted to the body 1505. Alternatively, the magnetic field sensor may be located in the helical channel 1550 and measure along a side surface. This embodiment simplifies mounting the PUF reader 1503 since the PUF reader 1503 does not require a mechanism to translate laterally along the helical PUF 1502.

Preferably, the locating pin 1526 is positioned offset from the axis of rotation 1518 to provide a torque on the helical PUF 1502 relative to the drive shaft 1580. This torque increases the friction between the helical PUF 1502 and the drive shaft 1580 to insure continuous contact between the locating pin 1526 and the helical flight 1510.

Figure 16:
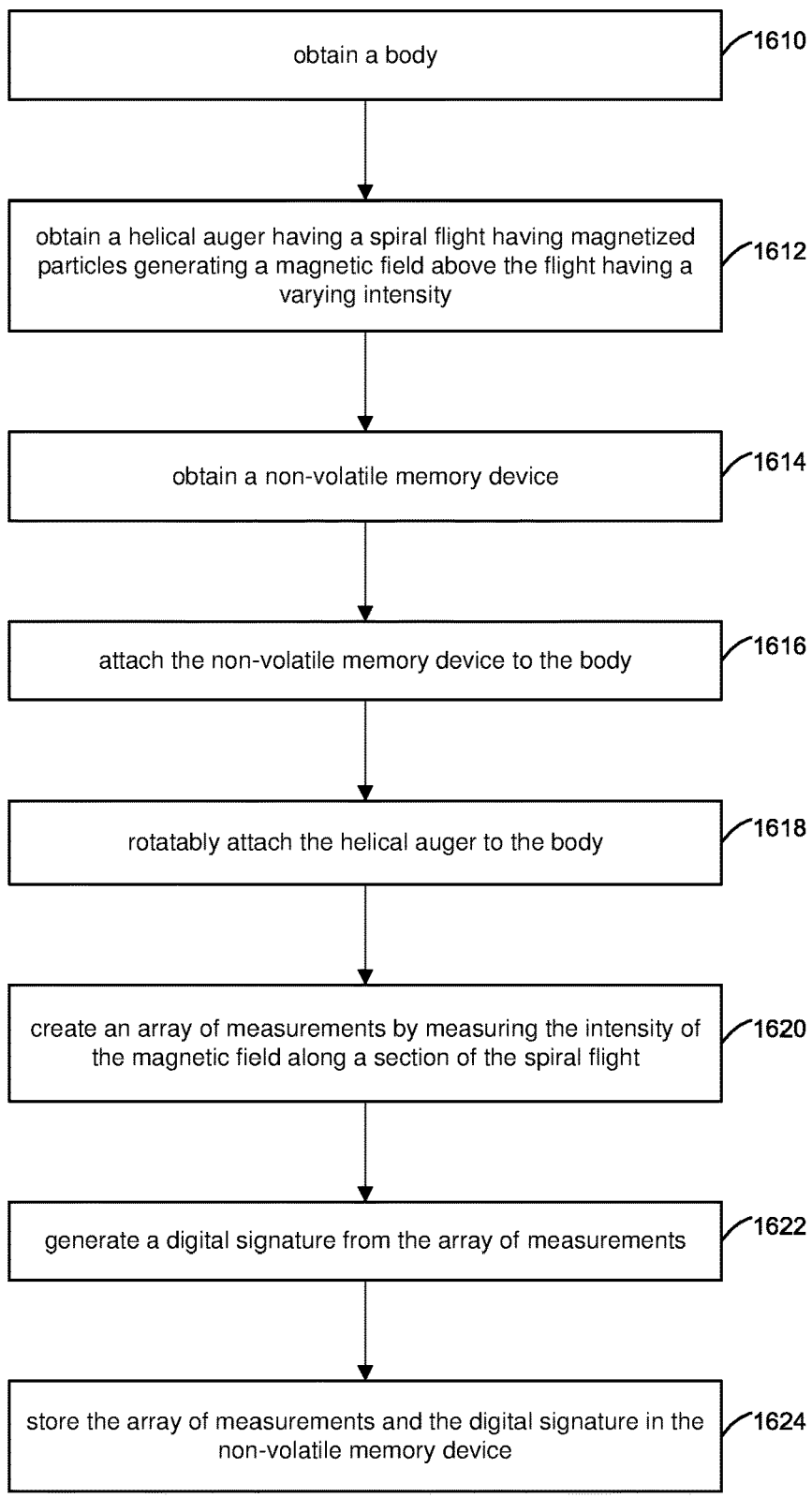
FIG. 16 is a flowchart of a method of manufacturing a supply item for an imaging device.

1 FIG. 16 shows an example embodiment of a method of manufacturing a supply item for an imaging device according to one embodiment. Method 1600 creates a supply item that is difficult to counterfeit.

At block 1610, a body is obtained. The body may be, for example, suitable to hold toner for an imaging device. At block 1612, a helical auger is obtained. The helical auger has a spiral flight having magnetized particles generating a magnetic field above the flight having a varying intensity. At block 1614, a non-volatile memory device is obtained. At block 1616, the non-volatile memory device is attached to the body. At block 1618, the helical auger is rotatably attached to the body.

At block 1620, an array of measurements are created by measuring the intensity of the magnetic field along a section of the spiral flight. At block 1622, a digital signature is generated from the array of measurements. At block 1624, the array of measurements is stored in the non-volatile memory device, and the digital signature is stored in the non-volatile memory device. These blocks may be performed in alternate orders.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner cartridge for an image forming device, comprising:
    a body for holding toner for use in the image forming device; and
    a flight, all components of which are located on the outside of the body for guiding a magnetic field sensor, the flight containing a plurality of magnetic particles, wherein a magnetic field intensity of the plurality of magnetic particles varies along a path of the magnetic field sensor.

2. The toner cartridge of claim 1, wherein the plurality of magnetic particles include flakes of an alloy of neodymium, iron and boron (NdFeB).

3. The toner cartridge of claim 1, wherein the flight is a helical flight.

4. The toner cartridge of claim 1, wherein the flight has a top surface and the magnetic particles generate a magnetic field extending above the top surface.

5. The toner cartridge of claim 1, wherein the flight has a rectangular cross section including a generally planar side surface.

6. The toner cartridge of claim 1, wherein the flight has a semi-circular cross section including a curved side surface.

7. The toner cartridge of claim 1, further including a shaft, the flight extending around the shaft.

8. The toner cartridge of claim 7, wherein the shaft and the flight are coextensive as one integral part.

9. The toner cartridge of claim 7, wherein the shaft and the flight are two separate parts attached together.

10. The toner cartridge of claim 1, further including a non-volatile memory containing a serial number of the body.

11. The toner cartridge of claim 1, further including a non-volatile memory containing an array of numbers corresponding to an intensity of a magnetic field generated by the plurality of magnetic particles measured at a plurality of locations along an extent of the flight.

12. The toner cartridge of claim 1, wherein the flight is configured to rotate about an axis of rotation.

13. The toner cartridge of claim 12, further including a shaft centered on the axis of rotation.

14. The toner cartridge of claim 13, wherein the flight extends from a surface of the shaft.

15. The toner cartridge of claim 13, wherein the flight is a channel extending into the shaft.

16. The toner cartridge of claim 12, wherein the shaft further includes additional pluralities of magnetic particles.

17. The toner cartridge of claim 12, wherein the flight is angled relative to the axis of rotation in a range of about thirty degrees to sixty degrees.

18. A toner cartridge for an image forming device, comprising:
    a body for holding toner for use in the image forming device;
    a flight, all components of which are located on the outside of the body for guiding movement of a magnetic field sensor, wherein the flight contains a plurality of magnetic particles that generate a magnetic field that the magnetic field sensor reads,
    further wherein a magnetic field intensity of the plurality of magnetic particles varies along a path of the magnetic field sensor; and a shaft, the flight being configured to rotate about an axis of rotation and the shaft extends along the axis of rotation.

19. The toner cartridge of claim 18, wherein the flight has a top surface and the magnetic field extends above the top surface.

20. The toner cartridge of claim 18, further including a non-volatile memory containing numbers corresponding to an intensity of the magnetic field generated by the plurality of magnetic particles measured at a plurality of locations along an extent of the flight.

* * * * *